United States Patent
Stefanov et al.

(10) Patent No.: US 10,402,213 B2
(45) Date of Patent: Sep. 3, 2019

(54) SOFTWARE APPLIANCE DISTRIBUTION WITH LAYER REMOVAL

(71) Applicant: SAP SE, Walldorf (DE)

(72) Inventors: Simeon Stefanov, Sofia (BG); Vladimir Vetov, Sofia (BG)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 15/607,032

(22) Filed: May 26, 2017

(65) Prior Publication Data

US 2018/0341471 A1    Nov. 29, 2018

(51) Int. Cl.
| | | |
|---|---|---|
| G06F 9/44 | (2018.01) | |
| G06F 9/445 | (2018.01) | |
| H04L 29/06 | (2006.01) | |
| G06F 3/06 | (2006.01) | |
| G06F 9/455 | (2018.01) | |
| G06F 8/61 | (2018.01) | |

(52) U.S. Cl.
CPC .............. G06F 9/455 (2013.01); G06F 8/63 (2013.01)

(58) Field of Classification Search
CPC ... G06F 8/60; G06F 8/30; G06F 8/656; G06F 11/3624; G06F 11/14; G06F 9/45533; G06F 8/62; G06F 21/10; G06F 9/455; G06F 3/0688; G06F 3/0619; G06F 3/0604; G06F 3/0659; G06F 3/065; G06F 8/61; G06F 8/63; G06F 12/0246; H04L 41/0893; H04L 41/5029; H04L 67/16; H04W 4/24
See application file for complete search history.

(56) References Cited

U.S. PATENT DOCUMENTS

| | | | | |
|---|---|---|---|---|
| 9,448,924 B2 * | 9/2016 | Sundaram | ............. | G06F 3/0688 |
| 10,019,191 B2 * | 7/2018 | Patil | ..................... | G06F 3/0643 |
| 10,146,563 B2 * | 12/2018 | Dettori | ................. | G06F 9/5077 |
| 10,169,209 B2 * | 1/2019 | McPherson | ......... | G06F 11/3668 |
| 10,261,782 B2 * | 4/2019 | Suarez | ................ | G06F 9/45558 |
| 2009/0217260 A1 * | 8/2009 | Gebhart | .................... | G06F 8/62 717/174 |

(Continued)

OTHER PUBLICATIONS

Abd-El-Malek et al., File system virtual appliances: Portable file system implementations, 26 pages (Year: 2012).*

(Continued)

Primary Examiner — Thuy Dao
(74) Attorney, Agent, or Firm — Klarquist Sparkman, LLP

(57) ABSTRACT

Techniques are provided for identifying and removing one or more layers of a software appliance. Layers may be identified and removed quickly and efficiently, without disrupting the distribution or provisioning of the software appliance, and without disrupting desired operations of the software appliance as a whole. In various implementations, it may be necessary or desirable to re-package the same or modified layer(s) within the software appliance at a later point in the distribution cycle of the software appliance. For example, one or more operating system layers may be identified and removed from a software appliance. Then, when the software appliance is distributed and provisioned in a cloud or other network context, a same or different version of the operating system layer(s) may be utilized in re-packaging the software appliance for one or more customers.

15 Claims, 4 Drawing Sheets

(56) References Cited

U.S. PATENT DOCUMENTS

| | | | | |
|---|---|---|---|---|
| 2010/0281458 A1* | 11/2010 | Paladino | ............... | G06F 8/71 |
| | | | | 717/106 |
| 2011/0271286 A1* | 11/2011 | Kemmler | ............... | G06F 9/485 |
| | | | | 718/106 |
| 2014/0180961 A1* | 6/2014 | Hankins | ............... | G06Q 10/10 |
| | | | | 705/348 |
| 2017/0289060 A1* | 10/2017 | Aftab | ............... | H04L 47/788 |
| 2017/0300394 A1* | 10/2017 | Raut | ............... | G06F 11/203 |
| 2018/0129479 A1* | 5/2018 | McPherson | ............... | G06F 11/3668 |

OTHER PUBLICATIONS

Wailly et al., VESPA: multi-layered self-protection for cloud resources, 5 pages (Year: 2012).*

* cited by examiner

SOFTWARE APPLIANCE DISTRIBUTION WITH LAYER REMOVAL

TECHNICAL FIELD

This description relates to techniques for distributing software appliances.

BACKGROUND

Software appliances are combinations of software components that are packaged together to provide convenient distribution, installation, use, and maintenance of included software. More particularly, a software appliance generally might include a partial or complete operating system, application server, web server, application(s), and/or database(s). Packaged together, such a software appliance can be included within a container, and ultimately distributed to users and installed on designated hardware platforms.

In practice, a developer or provider of a software appliance may not always wish to distribute the software appliance, to every user or hardware platform, in the same form that it was created. For example, a software appliance that may be suitably distributed in one context may not be suitable for distribution in another context. For example, it may be beneficial or necessary for technical or legal reasons to conform software appliance distribution and provisioning to desired standards or requirements. However, conforming software appliances may lead to additional or redundant efforts, wasted resources, and the possibility of malfunction of the software appliance.

SUMMARY

Techniques are provided for identifying and removing one or more layers of a software appliance. Layers may be identified and removed quickly and efficiently, without disrupting the distribution or provisioning of the software appliance, and without disrupting desired operations of the software appliance as a whole. In various implementations, it may be necessary or desirable to re-package the same or modified layer(s) within the software appliance at a later point in the distribution cycle of the software appliance. For example, one or more operating system layers may be identified and removed from a software appliance. Then, when the software appliance is distributed and provisioned in a cloud or other network context, a same or different version of the operating system layer(s) may be utilized in re-packaging the software appliance for one or more customers.

The details of one or more implementations are set forth in the accompanying drawings and the description below. Other features will be apparent from the description and drawings, and from the claims.

DETAILED DESCRIPTION

Figure 1:
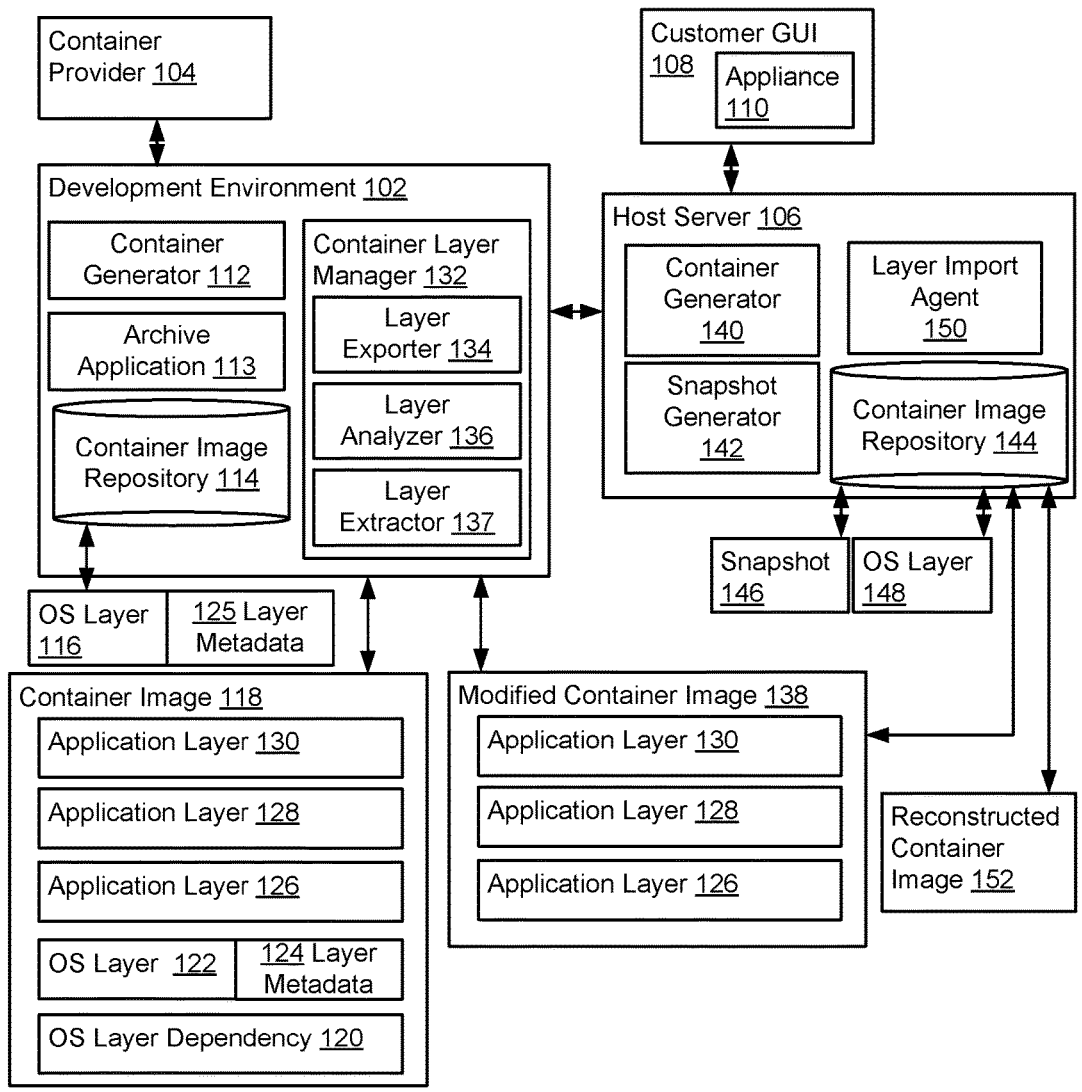
FIG. 1 is a block diagram of a system for software appliance distribution with layer removal.

FIG. 1 is a block diagram of a system 100 for software appliance distribution with layer removal. In the example of FIG. 1, a development environment 102 utilizes container technology from a container provider 104, along with hardware and related services provided by a host server 106. The development environment provides, via a customer graphical user interface (GUI) 108, a particular software appliance 110. In this way, as referenced above and described in more detail, below, customers may be provided with the various benefits of utilizing the software appliance 110.

In more detail, a container generator 112 generally represents software provided by the container provider 104, which is used in the development and distribution of the software appliance 110. Various types of container technology/software may be used. Specific examples are provided below, with respect to FIGS. 3 and 4, in which Docker container technology used, but other current or future container technologies may be used, as well. In general, as described in detail, below, such containers provide filesystems that include virtually any software that could be installed on a hardware server, such as code or runtime environments, or system tools, binaries, or libraries.

A container image repository 114 represents one or more storage techniques that may be used in, or by, the development environment 102. For example, the repository 114 may be local or remote, and/or may store container content for a developer, or a plurality of developers.

The repository 114 may store pre-configured elements that may be used (input) by the container generator 112, such as an operating system (OS) layer 116. The repository 114 also may store outputs of the container generator 112, including a container image 118 that corresponds to the software appliance 110 that is to be provided.

In this regard, and generally within this description, it will be appreciated that various container providers and technologies may use somewhat different terminology to describe the same or similar concepts in other container technologies. For the sake of consistency in the present description, the term container image refers generally to an inert file that typically includes a plurality of (sub)files, and that produces a container when it is run. Container images may be exported using various archiving techniques, such as a "tar" file(s), and stored as binary data within the repository 114. Container images which also capture or include current execution state information for an executing or executable instance of a container may be referred to as snapshots, as referenced below.

In the example of FIG. 1, the container image 118 includes a plurality of layers, as shown. In particular, the container image 118 includes a layer 120 that includes operating system (OS) dependencies, as well as an OS layer 122. A container is typically constructed in a layer-by-layer manner, including only (or primarily) those components that will be useful for the particular software appliance 110 being constructed.

More particularly, in specific examples, the container image 118 may be constructed by including new and/or pre-configured files in a container file using the container generator 112, and then using a "build" or similar container command, along with other context information as referenced below, to generate the container image 118. Then, the various layers of the container image correspond to file system changes specified by instructions within the container file (e.g., a Dockerfile). In other words, for example, the build process may execute instructions within the container file to generate the various layers, whereby the layers encapsulate the results of the executed instructions and track the file system changes.

In some cases, the layers may use, or leverage, pre-existing or pre-configured layers. For example, as described in detail below, the OS layer 122 may be included by using the OS layer 116 of the repository 114. In other words, as just explained, the OS layer 116 may represent a corresponding container file instruction that, when executed, includes the OS layer 122 within the container image 118.

The OS layer 122 and the OS layer dependency 120 represent partial operating systems, including selected or pre-configured binaries or libraries, that may be necessary in executing remaining layers 126, 128, 130 of the container image 118, to thereby provide the software appliance 110. For example, as described in detail below, the operating system of the software appliance 110 may share an OS kernel available at the host server 106. Consequently, it is not necessary to include a full operating system within the container image 118, and developers may construct or select optimized OS components for inclusion within the OS-related layers 120, 122.

As also shown in FIG. 1, the OS layer 122 may include layer metadata 124. As referenced below, the layer metadata 124 may include, among other aspects, a unique identifier for the OS layer 122. For example, the layer metadata 124 may represent a JSON (Javascript Object Notation) file that includes the identifier and other metadata. In addition to the layer metadata 124, it will be appreciated that the various other layers 120, 126-130, and 116 also may include individual layer metadata files, each file including an identifier for its corresponding layer. In the simplified example of FIG. 1, these additional layer metadata files are illustrated only with respect to the OS layer 116, i.e., as layer metadata 125, for reasons discussed below.

The layer metadata 124 may be known, or be able to be located, based on knowledge of the OS layer 116. The layer metadata 124 may be provided and used, in whole or in part, by the container generator 112 during normal operations thereof. For example, the container generator 112 may use the layer metadata of the various layers, e.g., to sequence the layers correctly, including building the layers in a hierarchical manner.

With respect to the illustrated application layers 126, 128, 130, it will be appreciated that these layers represent various components or aspects associated with constructing and implementing application(s) of the software appliance 110. For example, the various layers 126-130 may represent or include an application server, a database, and/or application code. Various related components may be included, such as an access console for configuring the software appliance 110, including configuration of authentication aspects. Many types of applications and application components may be included, and are not described here in further detail, except as may be necessary or helpful to understand the system 100 of FIG. 1.

Once the container image 118 is constructed, it may be saved as binary data within the repository 114, thus holding the layer structure. The container image 118 may be exported from the repository 114 as a tar file, or other archive file. Such an archive file may be constructed, and other archiving functionalities may be utilized, using one or more of these various types of known or future archiving applications, represented in FIG. 1 as archive application 113.

As referenced above, when it is desired to ship the container image 118 for provisioning to customers using the host server 106, it is sometimes desirable to remove one or more layers of the container image 118. More specifically, in the examples that follow, it is desired to remove any OS-related layers, and the OS layer 122 is described in particular detail.

For example, a particular layer, such as the OS layer 122, may include $3^{rd}$ party components (e.g., libraries) that may not be intended, authorized, or licensed for distribution by the provider of the container image 118. In other cases, the provider of the container image 118 may wish to enable or facilitate an upgrade of a layer being removed, or a change to a different type of the layer being removed when the software appliance is deployed, or at some point in the future.

However, identifying and removing a layer from the existing container image 118 may be problematic. For example, removing a layer from a tar archive of an image may cause failure in loading the application layers at run-time, even if the OS layer was previously loaded. For example, manually deleting the OS layer(s) and then loading the image for execution may result in errors and indications of corruption of the structure of the image 118.

In FIG. 1, the development environment 102 includes a container layer manager 132 that itself includes a layer exporter 134. The layer exporter 134 is configured to utilize the layer metadata 124, as described in detail, below, to identify the OS layer 122 for exporting.

For example, the layer exporter 134 may export both the OS layer 116 and the container image 118 as corresponding tar files, e.g., using or leveraging capabilities of the archive application 113. Then, a layer analyzer 136 may be configured to analyze and compare the two exported tar files, and thereby determine both the layer metadata 125 and the layer metadata 124.

In this way, the layer analyzer 136 may determine which of the exported layers of the tar archive of the container image 118 (i.e., the OS layer 122) includes the same identifier, within the layer metadata 124, as contained within the layer metadata 125 of the OS layer 116. For example, the layer analyzer 136 may include or utilize a text editor to examine the layer metadata files 124, 125, determine the included identifiers, and confirm a match therebetween.

Then, a layer extractor 137 may be configured to extract each layer of the container image 118 separately. That is, each layer will contain its own files. For example, if saved as tar files, a corresponding extraction command of the archive application 113 may be used to extract the individual layers. In this way, the identified OS layer(s) to be removed, e.g., the OS layer 122 (and also the OS layer dependency 120 and any other OS layer(s)), may be identified and separately deleted.

Then, a new tar file may be created using the archive application 113, and operating on the remaining layers, e.g., layers 126-130, of the container image 118. In other words, a modified container image 138 may be constructed in much the same manner as the container image 118 as described above, but including only the remaining layers 126-130.

The modified container image 138 may then be distributed to the host server 106, for storage using a container image repository 144. A container generator 140, corresponding to the container generator 112 and the container provider 104, is separately available. Further, a snapshot generator 142 may be configured to store, within the container image repository 144, a snapshot 146 corresponding to the modified container image 138. As referenced above, the snapshot 146 generally corresponds to the modified container image 138, while also containing a current, exact state of the corresponding container.

Other techniques also may be used to preserve such state information. Moreover, it will be appreciated that as the container generators 112, 140 are both available, some individual functionalities thereof may be performed by either container generator 112, 140 in various embodiments. Similarly, although the snapshot generator 142 is illustrated at the host server 106, it will be appreciated that some or all of the functionality thereof may be implemented at the development environment 102.

At the host server 106, the container image repository 144 is illustrated as including an OS layer 148. The OS layer 148 may correspond to the OS layer 116, and thus to the removed OS layer 122. For example, the OS layer 148 may be the same as, or an upgraded version of, the OS layer 116.

To provide the software appliance 110, e.g., such as when providing an instance of the software appliance 110 at a customer request, the application layers 126-130 may be extracted from the modified container image 138. For example, the archive application (not separately illustrated at the host server 106) may be used to perform this extraction(s). The snapshot 146 may be attached to the extracted layers.

Then, a layer import agent 150 may be configured to import all layers, one by one, from the relevant file systems stored in the container image repository 144 (e.g., the snapshot 146, the OS layer 148, and the modified container image 138). For example, the layer import agent 150 may represent a script installed at the host server 106, that is available for, and generic to, a plurality of container images and customers. The layer import agent 150 (e.g. instances, thereof) run within a customer environment of each relevant customer that is using the host server 106.

The layer import agent 150 may utilize the container generator 140 to identify the OS layer 148 and add files thereto, using the snapshot 146 and the modified container image 138. In this way, the container image repository 144 may store a reconstructed container image 152 corresponding to the original container image 118.

FIG. 1 is intended as a simplified example of computing environments that may be used to implement the described techniques. Various types of one or more computer processors, executing code stored on one or more types of non-transitory computer-readable storage media, may be used to implement the system 100 of FIG. 1. For example, although the system 100 is illustrated as including a number of separate, discrete components, it will be appreciated that any two or more components or sub-components may be combined for operation of the single component, while, conversely, a single component may be operated as two or more separate sub-components.

Figure 2:
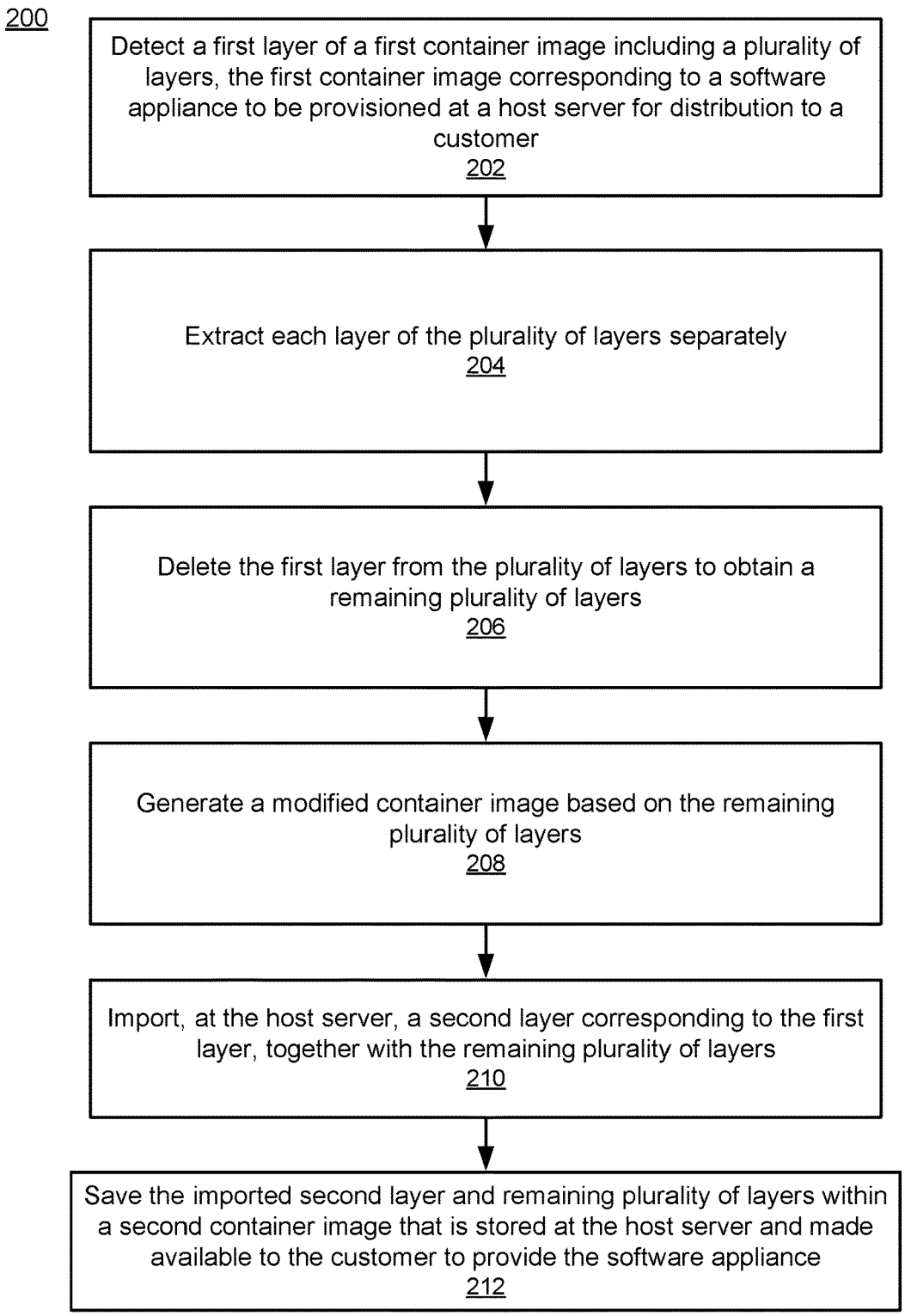
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. In various implementations, additional or alternative operations or sub-operations may be included, and/or one or more operations or sub-operations may be omitted. In all such implementations, any two or more operations or sub-operations may be executed in a partially or completely overlapping or parallel manner, or in a nested, iterative, looped, or branched fashion.

In the example of FIG. 2, a first layer of a first container image including a plurality of layers is detected, the first container image corresponding to a software appliance to be provisioned at a host server for distribution to a customer (202). For example, the layer exporter 134 and the layer analyzer 136 may be configured to examine the container image 118 corresponding to the appliance 110 to detect the OS layer 122, based on the OS layer 116. For example, the layer exporter 134 may be configured to determine a file containing an identifier of the layer 116 and a file containing an identifier of the OS layer 122. As described, the layer analyzer 136 may be configured to analyze a tar file corresponding to the OS layer 116 for a metadata identifier corresponding to a metadata identifier obtained from a tar extraction process performed on the container image 118 as a whole, e.g., to match the identifiers of the layer metadata 124, 125.

Then, each layer of the plurality of layers may be extracted separately (204). For example, a layer extractor 137 may be configured to extract the layers separately, e.g., using a particular archive application 113.

The first layer may be deleted from the plurality of layers to obtain a remaining plurality of layers (206). For example, the layer extractor 137 may be configured to delete the OS layer 122.

A modified container image may be generated, based on the remaining plurality of layers (208). For example, the modified container image 138 may be generated using the container generator 112, including only the remaining layers 126-130.

At the host server, a second layer corresponding to the first layer may be imported, together with the remaining plurality of layers (210). For example, the layer import agent 150 may import the OS layer 148 and the layers of the modified container image 138.

The imported second layer and remaining plurality of layers may be saved within a second container image that is stored at the host server and made available to the customer to provide the software appliance (212). For example, the layer import agent 150 may instruct the container generator 140 to generate the reconstructed container image 152 for use in providing the appliance 110.

Figure 3:
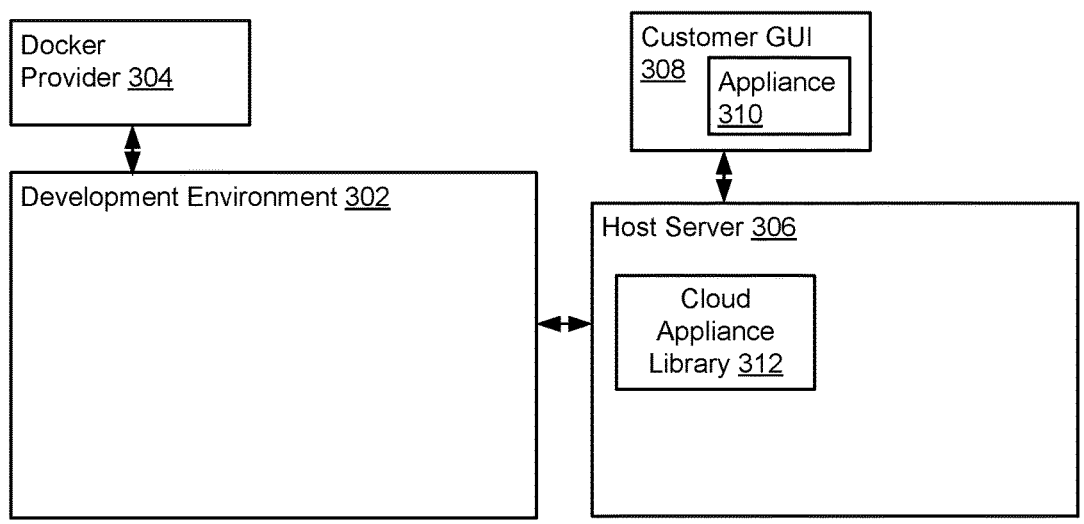
FIG. 3 is a block diagram of an example implementation of the system of FIG. 1.

FIG. 3 is a block diagram of a system 300 illustrating an example implementation of the system 100 of FIG. 1. In the example of FIG. 3, development environment 302 is illustrated as using a container provider 304 that is itself illustrated as providing the Docker container software. A host server 306, providing a customer GUI 308 with an appliance 310, is illustrated as including a cloud appliance library 312.

For example, the cloud appliance library 312 may represent an online repository of recent, pre-configured software solutions, which can be instantly consumed in the cloud by way of the customer GUI 308. Such a cloud appliance library enables a user experience that enables, e.g., test, demo, trial and development systems that ultimately provide access to the selected appliance 310 within minutes.

For example, the cloud appliance library might represent the SAP Cloud Appliance Library of SAP SE, a preconfigured SAP System offered on SUSE Linux Enterprise Server in the Amazon AWS cloud. Of course, as already referenced, all of the above examples are non-limiting and provided merely for the sake of illustration and explanation, and other container providers, cloud libraries, host servers/platforms, and various other components or aspects referenced with respect to FIGS. 1-3 may be used, as well.

Figure 4:
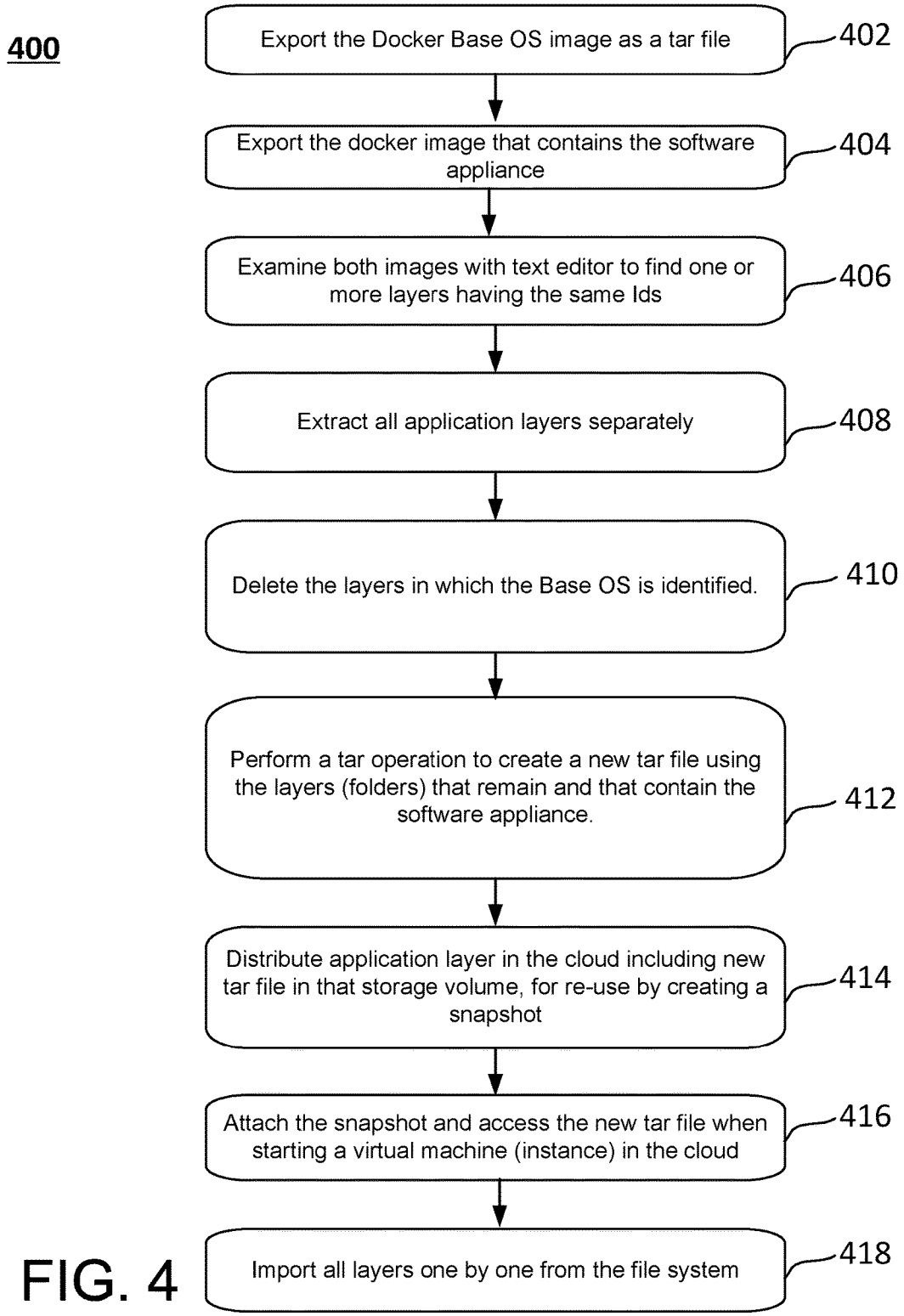
FIG. 4 is a flowchart illustrating example operations of the system of FIG. 3.

Example operations of FIG. 3 are provided below with reference to the flowchart 400 of FIG. 4. In the example of FIG. 4, it is assumed that the software appliance 310 is built using, and for operation on, a SUSE Linux Enterprise server, using the SUSE Linux operating system, and that the layer(s) being removed include one or more OS layers, as referenced above. As is known, the SUSE Linux OS is built using the open source Linux kernel, and the SUSE Linux Enterprise Server for SAP applications provides an optimized OS platform that is validated by SAP for all relevant SAP solutions.

In FIG. 4, to detect the layer(s) holding the Base OS layer for deletion from a corresponding tar file(s), the docker Base OS image may be exported as a tar file (402). For example, this may occur by exporting the Docker Base OS image as a tar file using the following commands: "docker images," which will list all images registered in the local Docker repository (e.g., the repository 114 of FIG. 1), and "docker save selected_docker_base_os_image>/path/on/system/image.tar."

Then, the docker image that contains the software appliance may also be exported (404). For example, the following command may be used: "docker images," which will list all images registered in the local Docker repository, and "docker save selected_appliance_image>path/on/system/appliance.tar."

Both images can be examined with an appropriate text editor (406), e.g., the Vim text editor. Both images will have one or more layers having the same identification number(s) (Ids). Those layers may thus be interpreted to contain the base OS layer.

Then, all application layers may be extracted separately (408). In other words, every layer will contain only its own files. Since the images are saved as plain tar files, those can be easily extracted using the following command: "tar -xzf image.tar -c /path/on/system/". Under the folder/path/on/system/, subfolders with IDs will be present that include the docker image layers stored in the tar file.

The layers in which the Base OS is identified may be deleted (410). Many times these layers (folders) may include one to three layers, but more could be included. The layers (folders) that remain contain the software appliance, and a tar operation may be performed to create a new tar file (412), using the following command: "cd /path/on/system," "tar -cf detached_image.tar *".

The application layer may be distributed in the cloud, including within that storage volume the detached_image.tar file (414). In this way, the detached_image.tar file may be reused by creating a snapshot or other mechanism that saves the exact state of a storage container in the cloud, as referenced herein. For example, the snapshot may be used to provide an instance at the host server 306, and an API to start the instance and attach an empty volume to it. With the instance with the empty volume, we can connect to this instance, and copy the content. After the content is copied to the empty volume, the API may be used again to create the snapshot out of the volume.

In the example, SUSE or other provider of a Base OS layer may provide the BASE OS layer (e.g., a docker Base OS layer). Therefore, when starting a virtual machine (instance) in the cloud, the snapshot may be attached to access the detached_image.tar file (416). It is thus possible to extract the detached_image.tar file as described above with respect to operation 408.

Finally in FIG. 4, using the Docker Build process in conjunction with a corresponding import agent such as the layer import agent 150 of FIG. 1, all layers may be imported one by one from the file system in which they were stored at operations 408 and 416. In this example, the Docker Build process involves creating a dockerfile, which will instruct docker as to the Base OS from which to start, as well as which files to add for the final image, as shown in the example docker file of Pseudocode 1:

| Pseudocode 1 |
| --- |
| FROM SLES12 #base os provided by SUSE<br>    ADD /path/on/system/subfolder_id1 / #This takes the files from the first path and adds them to the second path in the docker container file system.<br>    ADD /path/on/system/subfolder_id2 /<br>    ...<br>    ADD /path/on/system/subfolder_idN / |

The file may be saved and the Docker build process may be called by executing the following command: "cd/path/to/dockerfile" "docker build." In this way, the original appliance may be provided, but without distributing the Base OS layer (and any associated libraries) with the distributed packages.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
   detecting a first layer of a first container image including a plurality of layers, the first container image corresponding to a software appliance to be provisioned at a host server for distribution to a customer;
   extracting each layer of the plurality of layers separately;
   deleting the first layer from the plurality of layers to obtain a remaining plurality of layers;
   generating a modified container image based on the remaining plurality of layers;
   importing, at the host server, a second layer corresponding to the first layer, together with the remaining plurality of layers;
   saving the imported second layer and remaining plurality of layers within a second container image that is stored at the host server and made available to the customer to provide the software appliance;
   wherein detecting the first layer of the first container image comprises:
   exporting a stored layer corresponding to the first layer to a first archive file;
   exporting the plurality of layers of the first container image to a second archive file; and
   comparing the first archive file to the second archive file.

2. A computer program product, the computer program product being tangibly embodied on a non-transitory computer-readable storage medium and comprising instructions that, when executed, are configured to cause at least one computing device to:
   detect a first layer of a first container image including a plurality of layers, the first container image corresponding to a software appliance to be provisioned at a host server for distribution to a customer;
   extract each layer of the plurality of layers separately;
   delete the first layer from the plurality of layers to obtain a remaining plurality of layers;
   generate a modified container image based on the remaining plurality of layers;
   import, at the host server, a second layer corresponding to the first layer, together with the remaining plurality of layers;
   save the imported second layer and remaining plurality of layers within a second container image that is stored at the host server and made available to the customer to provide the software appliance;
   wherein detecting the first layer of the first container image comprises:
   exporting a stored layer corresponding to the first layer to a first archive file;
   exporting the plurality of layers of the first container image to a second archive file; and
   comparing the first archive file to the second archive file.

3. The computer program product of claim 2, wherein the instructions, when executed, are further configured to detect the first layer including:
   detecting, in the first archive file, a first layer identifier stored in a first metadata file of the stored layer;
   detecting, in the second archive file, a second layer identifier stored in a second metadata file of the first layer; and
   comparing the first layer identifier and the second layer identifier to determine a match therebetween.

4. The computer program product of claim 3, wherein the instructions, when executed, are further configured to delete the first layer including:
   deleting the first layer, based on the match between the first layer identifier and the second layer identifier.

5. The computer program product of claim 2, wherein the instructions, when executed, are further configured to extract each layer including:
   extracting each layer from the second archive file, using an extraction command of a corresponding archive application.

6. The computer program product of claim 5, wherein the instructions, when executed, are further configured to delete the first layer including:
   deleting the first layer from the second archive file.

7. The computer program product of claim 2, wherein the instructions, when executed, are further configured to:
   distribute the modified container image to the host server;
   provide a snapshot maintaining a state of a corresponding container for storage at the host server in conjunction with the modified container image.

8. The computer program product of claim 2, wherein the instructions, when executed, are further configured to:
   provide an import agent at the host server, including a script that is configured to import the second layer and the remaining plurality of layers.

9. The computer program product of claim 8, wherein the import agent is generic to a plurality of customers, including the customer, and generic to a plurality of container images, including the modified container image and the second container image.

10. The computer program product of claim 2, wherein the first layer and the second layer include one or more operating system layers.

11. The computer program product of claim 2, wherein the second layer is pre-stored at the host server.

12. The computer program product of claim 2 wherein:
    the first layer and the second layer comprise identical operating system layers comprising third party components.

13. The computer program product of claim 2 wherein:
    the first layer and the second layer comprise identical layers comprising third party components.

14. A computer program product, the computer program product being tangibly embodied on a non-transitory computer-readable storage medium and comprising instructions that, when executed, are configured to cause at least one computing device to:

detect a first layer of a first container image including a plurality of layers, the first container image corresponding to a software appliance to be provisioned at a host server for distribution to a customer;

extract each layer of the plurality of layers separately;

delete the first layer from the plurality of layers to obtain a remaining plurality of layers;

generate a modified container image based on the remaining plurality of layers;

import, at the host server, a second layer corresponding to the first layer, together with the remaining plurality of layers;

save the imported second layer and remaining plurality of layers within a second container image that is stored at the host server and made available to the customer to provide the software appliance;

wherein the instructions, when executed, are further configured to:

distribute the modified container image to the host server;

provide a snapshot maintaining a state of a corresponding container for storage at the host server in conjunction with the modified container image; and generate the second container image based on the second layer, the modified container image, and the snapshot.

15. The computer program product of claim 14 wherein:

the first layer and the second layer comprise identical operating system layers comprising third party components.

\* \* \* \* \*